US008346461B2

(12) United States Patent
Moessner

(10) Patent No.: US 8,346,461 B2
(45) Date of Patent: Jan. 1, 2013

(54) METHOD FOR CONTROLLING A START-UP OF AN INTERNAL COMBUSTION ENGINE

(75) Inventor: David Moessner, Lorch (DE)

(73) Assignee: Robert Bosch GmbH, Stuttgart (DE)

( * ) Notice: Subject to any disclaimer, the term of this patent is extended or adjusted under 35 U.S.C. 154(b) by 719 days.

(21) Appl. No.: 12/249,300

(22) Filed: Oct. 10, 2008

(65) Prior Publication Data

US 2009/0118992 A1 May 7, 2009

(30) Foreign Application Priority Data

Oct. 22, 2007 (DE) ......................... 10 2007 050 306

(51) Int. Cl.

*F02N 11/00* (2006.01)
*F02N 11/08* (2006.01)
*G06G 7/70* (2006.01)
*H02P 9/04* (2006.01)

(52) U.S. Cl. .................. 701/113; 123/179.3; 123/179.4; 123/179.28; 123/179.22; 701/110; 701/112; 290/38 R; 290/38 B

(58) Field of Classification Search ............... 123/179.3, 123/179.4, 179.5, 179.22, 179.16, 179.28; 701/102, 110, 112, 113; 290/38 R, 38 B, 290/38 C, 49

See application file for complete search history.

(56) References Cited

U.S. PATENT DOCUMENTS

| | | | | |
|---|---|---|---|---|
| 5,687,682 | A * | 11/1997 | Rembold et al. | 123/179.3 |
| 7,134,414 | B2 * | 11/2006 | Ries-Mueller et al. | 123/179.3 |
| 7,962,278 | B1 * | 6/2011 | Patterson et al. | 701/113 |
| 8,195,380 | B2 * | 6/2012 | Patterson et al. | 701/113 |
| 2004/0200448 | A1 * | 10/2004 | Kojima et al. | 123/179.3 |

* cited by examiner

*Primary Examiner* — Stephen K Cronin
*Assistant Examiner* — Raza Najmuddin
(74) *Attorney, Agent, or Firm* — Merchant & Gould P.C.

(57) ABSTRACT

Method for controlling a start-up of an internal combustion engine, an actuation of the internal combustion engine being begun and maintained by an electric machine in order to set the internal combustion engine into independent motion, thereby characterized, in that the actuation of the internal combustion engine is concluded before an initial combustion in the internal combustion engine takes place.

8 Claims, 3 Drawing Sheets

METHOD FOR CONTROLLING A START-UP OF AN INTERNAL COMBUSTION ENGINE

TECHNICAL FIELD

The invention at hand relates to a method for controlling a start-up of an internal combustion engine, an apparatus and a computer program product according to the preambles of claim 1 and the coordinate claims.

BACKGROUND

It is known from the technical field how to set internal combustion engines in motion by means of an electric machine, for example a starter, until the initial combustions independently accelerate the internal combustion engine up until an idling speed is achieved. In so doing, the starting assistance by the starter takes place as a rule up until the crankshaft has exceeded a rotational speed threshold, at which an already active combustion can assuredly be assumed. This type of start-up indeed offers on the one hand a high degree of reliability; however, on the other hand, the starter and the power source supplying the starter with energy are heavily stressed.

The disadvantage with the technical field is therefore that the conventional start-up requires much energy and furthermore has as a consequence a high degree of stress being placed on the involved components, particularly the starter.

SUMMARY

It is a task of the invention to improve the methods and apparatuses, which are described above, and especially to state a method for starting an internal combustion engine, wherein the power output is reduced and the electric machine used for starting the internal combustion engine is exposed to smaller stresses.

This problem is solved by a method for controlling a start-up of an internal combustion engine, wherein an actuation of the internal combustion engine is begun and maintained by an electric machine in order to set the internal combustion engine into independent motion. Said method is thereby characterized, in that the actuation of the internal combustion engine is concluded before an initial combustion in the internal combustion engine takes place. The electric machine can be a starter. The internal combustion engine is preferably a reciprocating piston internal combustion engine. The method can, however, also be applied to rotary piston internal combustion engines. The invention is advantageously employed within the scope of a start-stop operation because numerous parameters of the internal combustion engine are known for such an operation. It is, however, also possible to employ the invention for an initial start-up. The invention provides the advantage of the power output being reduced for the start-up and the stress on the electric machine being reduced. In so doing, the invention makes the most of the fact; that during a start-up, the internal combustion engine as a rule has already before the initial combustion sufficiently stored kinetic energy in order to travel to the first top dead center, whereat the initial combustion can take place. If the initial combustion then takes place, this (combustion) sufficiently develops the energy warranted to accelerate the internal combustion engine further and also especially to allow for subsequent combustions, so that the start-up is successfully completed.

The internal combustion engine to be started advantageously has a crankshaft, which is driven by the electric machine during actuation of the internal combustion engine.

In so doing, the power transmission from the electric machine to the crankshaft preferably takes place with a flywheel starter ring gear, into which the starter engages as an electric machine. The disengagement occurs within the scope of the invention prior to the initial combustion in the internal combustion engine. The internal combustion engine is preferably operated with direct gasoline injection; and in so doing, this provides the advantage of a variable mixture delivery into the individual combustion chambers of the internal combustion engine. The invention is, however, also applicable to an intake manifold fuel injection or a direct diesel fuel injection.

A combustion-angular position of the crankshaft, whereat the initial combustion in the internal combustion engine is considered possible, is preferably ascertained prior to the beginning or right during or immediately after the beginning of actuation of the internal combustion engine. In so doing, the actuation is concluded prior to the crankshaft achieving the combustion-angular position, which was ascertained. 'Immediately after the beginning of actuation' means then a time span, which is necessary for determining the angular position of the internal combustion engine during start-up. This is only then necessary if the angular position of the internal combustion engine is not already known when the internal combustion engine is at rest, as is possible when a run-out detection is present. Other possibilities for determining the angular position of the internal combustion engine before the beginning of the actuation or right during or immediately after the beginning of the actuation include a synchronization via a phase sensor wheel and a rotational-speed sensor wheel or other methods and apparatuses for acquiring angular positions. The combustion-angular position is preferably ascertained from two additional parameters: the angle, which is necessary, to accelerate the internal combustion engine to a certain rotational speed, whereat achieving the next top dead center is possible, and the top dead center, whereat an ignitable mixture is present in the corresponding combustion chamber. The precondition is that a certain minimum quantity of air must already be present in order to generate an ignitable mixture in the corresponding combustion chamber prior to the beginning of the start-up. The quantity of air, which is present in the combustion chamber, can be calculated from the volume of the combustion chamber when the engine is at rest, the temperature of the internal combustion engine, respectively the oil temperature of the internal combustion engine, and the ideal gas law. In the event that the angular position of the internal combustion engine is known, the volume of the combustion chamber can be suggested. The mixture generation for the next possible ignitable combustion chamber can then immediately be started at the beginning of the actuation. The angular position of the top dead center, whereat the initial or the next combustion is possible, is herein denoted as the combustion-angular position. This method is equally applicable to both a gasoline direct injection and an intake manifold injection. In so doing, it is to be taken into account that an adequate movement of the pistons in the combustion chambers is necessary for the intake manifold fuel injection.

The actuation of the internal combustion engine is preferably concluded at an end-of-actuation angular position of the crankshaft, which was ascertained prior to the beginning or right during or immediately after the beginning of the actuation. Thus, it is not only possible to complete the actuation immediately prior to the combustion-angular position in order to save energy; but it is in fact also possible to conclude the actuation even earlier, i.e. at the end-of-actuation angular position. This helps to save energy. This is then particularly possible, if as a result of marginal conditions for the mixture generation, which were described above, the internal combustion engine has to initially be actuated for an extended period of time, which is longer than is absolutely necessary for the acceleration up to a certain rotational speed. In the event that an initial combustion is first possible at a later top dead center due to the marginal conditions for the mixture generation, the starter can thus be already earlier disengaged prior to this later top dead center. This is the case because the internal combustion engine has already been previously sufficiently accelerated.

The end-of-actuation angular position or the combustion-angular position is preferably ascertained as a function of a temperature of the internal combustion engine, an at rest angular position of the internal combustion engine prior to the beginning of the actuation or another parameter. The combustion-angular position is thus preferably established as a function of the parameters: start-up angle and temperature of the internal combustion engine. The actuation is preferably concluded earlier relative to the first combustion-angular position in the event that the internal combustion engine due to the operative marginal conditions is accelerated longer than is necessary for the acceptance of sufficient, kinematical energy. This circumstance can, for example, occur in the event that the operative marginal conditions lead to the point, where a very high rotational speed would be present at the combustion-angular position. When considering the marginal operative conditions, it is especially important to understand the fact that a certain angular advancement of the crankshaft is required in order to supply a desired mixture to a first combustion chamber. Said mixture has to sufficiently release energy during ignition so that the internal combustion engine can run independently.

A comparison of the rotational speed of the crankshaft with a dead center minimum rotational speed, whereat the internal combustion engine achieves the next top dead center without actuation, is preferably performed; and the actuation of the internal combustion engine is only concluded in the event that the rotational speed of the crankshaft is at least as high as the dead center minimum rotational speed. This provides the advantage that the crankshaft continues to rotate at least up until a next top dead center is achieved, whereat a mixture can be ignited. A conclusion of the actuation prior to the threshold being achieved would lead to the internal combustion engine stopping before the dead center is achieved. The dead center minimum rotational speed is not a constant quantity but is a function of the angular position of the crankshaft because, for example, shortly before the dead center, a smaller kinematical energy is sufficient to achieve the dead center than at an angular position of the crankshaft, which is further away from the next dead center. The dead center minimum rotational speed is preferably a rotational speed, whereat the internal combustion engine achieves the next top dead center without actuation with a residual minimum rotational speed, i.e. the kinematical energy is not completely converted when the top dead center is achieved.

A restarting of the actuation advantageously takes place after the conclusion of the actuation in the event that after the conclusion of the actuation, the rotational speed is smaller than a dead center minimum rotational speed, whereat the internal combustion engine achieves the next top dead center without actuation or in the event that the rotational speed drops. What has been described above analogously applies to the dead center minimum rotational speed. A drop in the rotational speed indicates that no suitable combustion has taken place. This is true at least in the event that the rotational speed drops before a conventional threshold for the rotational speed is achieved for a combustion detection. This conventional rotational speed threshold is usually high enough that a combustion can be assumed with certainty. In general, the restarting of the actuation provides the advantage that an emergency program is started, with which a start-up of the internal combustion engine is supposed to be assuredly achieved and which goes practically unnoticed by the driver. A test is also preferably made within the scope of the restarting of the actuation to determine whether the previous assumptions for the start-up can be maintained or if parameters of the method for controlling the start-up have to be adapted. An adaptation of the parameters is then advantageously performed. The method can generally also be used for the purpose of diagnosing the combustion prediction as faulty. During actuation of the internal combustion engine after the restarting of the actuation, the combustion prediction can once again be checked because a combustion takes place sometime during this second actuation. On the basis of said combustion, the combustion prediction can then be checked.

The actuation is advantageously not concluded after the restarting of the actuation before the rotational speed of the crankshaft has achieved a combustion-minimum rotational speed, whereat a combustion has assuredly taken place or which is greater than the dead center minimum rotational speed. The combustion-minimum rotational speed corresponds to the conventional threshold for the rotational speed for combustion detection, which is employed in conventional systems for the start-up of an internal combustion engine. This assures that after an unsuccessful first attempt at starting the engine, the internal combustion engine is nevertheless assuredly started after the restarting of the actuation.

A further, independent subject matter of the invention is an apparatus, particularly a control unit for controlling a start-up of an internal combustion engine, which is equipped for the implementation of a method according to the invention, if need be with one or a plurality of the advantageous characteristics described above.

Furthermore, an independent subject matter of the invention is a computer program with a program code for the implementation of a corresponding method if the program is executed on a computer.

BRIEF DESCRIPTION OF THE DRAWINGS

An example of embodiment of the invention at hand is described below in detail with the aid of the associated drawings. The following items are thereby shown.

DETAILED DESCRIPTION

Figure 1:
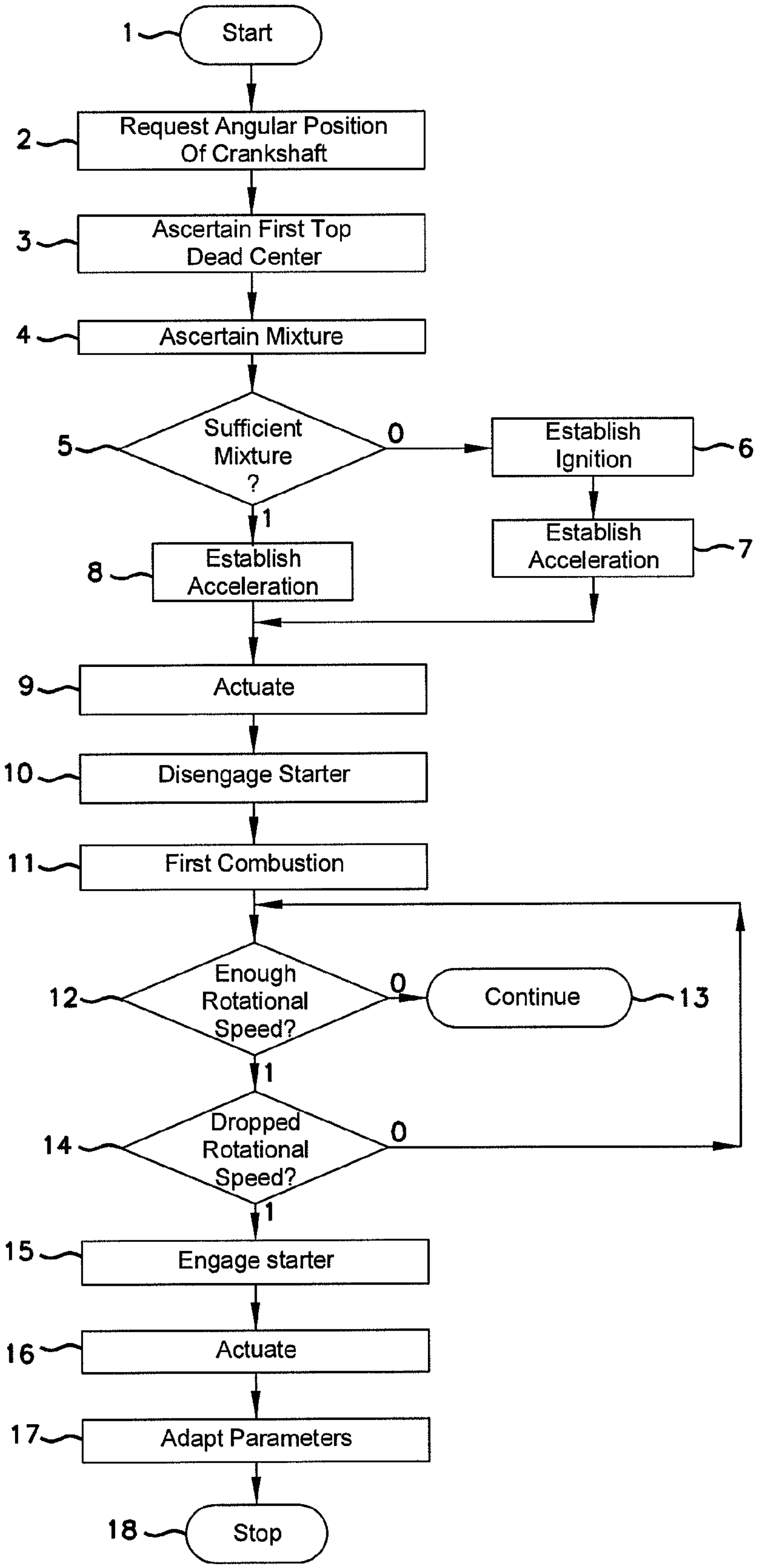
FIG. 1 is a schematic diagram of a method according to the invention.

A method according to the invention is schematically depicted in FIG. 1, which is used for an internal combustion engine with direct gasoline injection in the start-stop operation. The internal combustion engine is an Otto engine with four combustion chambers, which is operated in the four-stroke process. It is also possible to apply the method to an internal combustion engine with an intake manifold fuel injection or to apply the method to an initial start-up of an internal combustion engine after having been shutdown. In so doing, information concerning the angular position of the crankshaft of the internal combustion engine should, however, be known before start-up as was custom in the start-stop operation. The description is based on a conventional system consisting of an electric machine and an internal combustion engine, the electric machine thereby having exclusively or among other things the task of starting the internal combustion engine so that it can be independently operated. Such systems are adequately known from the technical field by the technician. For that reason, they will not be further described here.

The method starts in Step 1. The method starts upon a request for starting an internal combustion engine within the scope of a start-stop operation. In the subsequent Step 2, the angular position of the crankshaft of the stationary internal combustion engine is requested, which was stored during run-out of the internal combustion engine. A first top dead center is subsequently ascertained in Step 3, whereat a stipulated minimum rotational speed, in this instance 150 revolutions per minute, can be achieved. In so doing, this corresponds to the kinematical energy, with which the internal combustion engine can independently run when a combustion takes place.

It is ascertained in Step 4 whether for the respective combustion chamber, whereat the first top dead center can be achieved with a sufficient rotational speed, a mixture can also be provided, with which a combustion is possible, which is sufficient to further accelerate the internal combustion engine. Within the scope of this ascertaimnent, a calculation is made on the basis of the oil temperature of the internal combustion engine and the position of the piston in the combustion chamber at rest prior to the beginning of the start-up to determine the quantity of air situated in the combustion chamber and whether this quantity of air is sufficient for a stipulated mixture. In the process, it must be taken into account that ambient air pressure prevails in the combustion chamber when the internal combustion engine is at rest; and with the aid of the ideal gas law, the quantity of gas in the combustion chamber, whose volume is limited by the piston, can be suggested on the basis of the oil temperature. The piston position is known from the angular position ascertained in Step 2. It is established in Step 5 whether a sufficient mixture (Step 4) can also be provided at the first top dead center ascertained in Step 3. If the check made in Step 5 shows that a sufficient minimum rotational speed of the crankshaft of the internal combustion engine can in fact be achieved at a first top dead center (Step 3); however, at this first top dead center a mixture cannot be provided, which is sufficient for an independent operation of the internal combustion engine (Step 4), the method then continues with Step 6. It is established in Step 6 that a sufficient mixture can first be provided at the next top dead center of the internal combustion engine, whereat a mixture ignition can take place. Furthermore, it is subsequently established in Step 7 that during the subsequent acceleration of the internal combustion engine by the electric machine, the internal combustion engine is accelerated longer around a top dead center (180° of crankshaft revolution) less 40° of crankshaft revolution. The angular position calculated in this manner is denoted as the end-of-actuation angular position. The subtraction of the 40° of crankshaft revolution results because it can thereby be assumed, that due to the longer acceleration phase, the internal combustion engine upon conclusion of the actuation already has a significantly higher rotational speed than the minimum rotational speed stipulated in Step 3. It can therefore be assumed that the internal combustion engine still achieves the top dead center, whereat the mixture is ignited.

On the other hand if the check in Step 5 shows that already at the first top dead center, whereat a sufficient minimum rotational speed is achieved (Step 3), a desirable mixture is present (Step 4), the method thus continues after Step 5 at Step 8; while likewise as in Steps 6 and 7, it is established up until which angular position the internal combustion engine is accelerated by the electric machine. This angular position is denoted as the end-of actuation angular position. The end-of-actuation angular position can lie before the combustion-angular position, which corresponds to the first top dead center, whereat a sufficient mixture is present (Step 4). The end-of-actuation angular position is therefore different, as it is a function of the check in Step 5.

The beginning of the actuation of the internal combustion engine by the electric machine (Step 9) is subsequent to Step 7 or Step 8. In Step 10 the electric machine is again disengaged from the flywheel starter ring gear of the crankshaft when the previously established end-of-actuation angular position is achieved. The first combustion subsequently occurs in Step 11.

The time history of the rotational speed of the crankshaft is subsequently checked in order to monitor the operation of the internal combustion engine. A check is therefore initially made in Step 12 to determine whether the rotational speed is lower than a rotational speed, which at least must be present in order to achieve the next top dead center. In the event that the check in Step 12 shows that the rotational speed is sufficiently high to achieve the next top dead center, it can be assumed that the first combustion, which occurred in Step 11, was successful and that the method concludes in Step 13 because the internal combustion engine now runs independently. If the check in Step 12 shows that the rotational speed is still not sufficiently high, a check is made in Step 14 to determine whether the rotational speed has dropped. In order to do this, a rotational speed, which was ascertained during the ignition in Step 11 (rotational speed at top dead center), is compared with the actual progression of the rotational speed. If it is now established in Step 14 that the actual rotational speed is lower than the rotational speed during ignition of the mixture in Step 11, it can be assumed that the start-up was not successful. Otherwise the check in Step 12 is repeated to determine whether the rotational speed in the meantime is higher than a rotational speed, which at least must be achieved in order to achieve the next top dead center. The method therefore jumps from Step 14 back to Step 12 in order to check whether the internal combustion engine was perhaps indeed successfully started. If, however, in Step 14 it is established as described above that the rotational speed has dropped, it is assumed that the start-up was not successful, and the method continues on in Step 15.

In Step 15, the electric machine is again engaged and an actuation of the internal combustion engine subsequently occurs up until a rotational speed threshold is achieved, whereat a combustion can be assuredly assumed (Step 16). This corresponds to a conventional start-up of an internal combustion engine and is not described in detail. The parameters, which were gathered during the unsuccessful start-up, and those gathered during the conventional start-up, which was subsequently implemented, are however used in a subsequent Step 17 in order to check and if need be adapt the parameters of the method according to the invention. This is done in order to construct a subsequent implementation of the method according to the invention in a manner which promises more success for the next start-up. The method concludes in Step 18.

Figure 2:
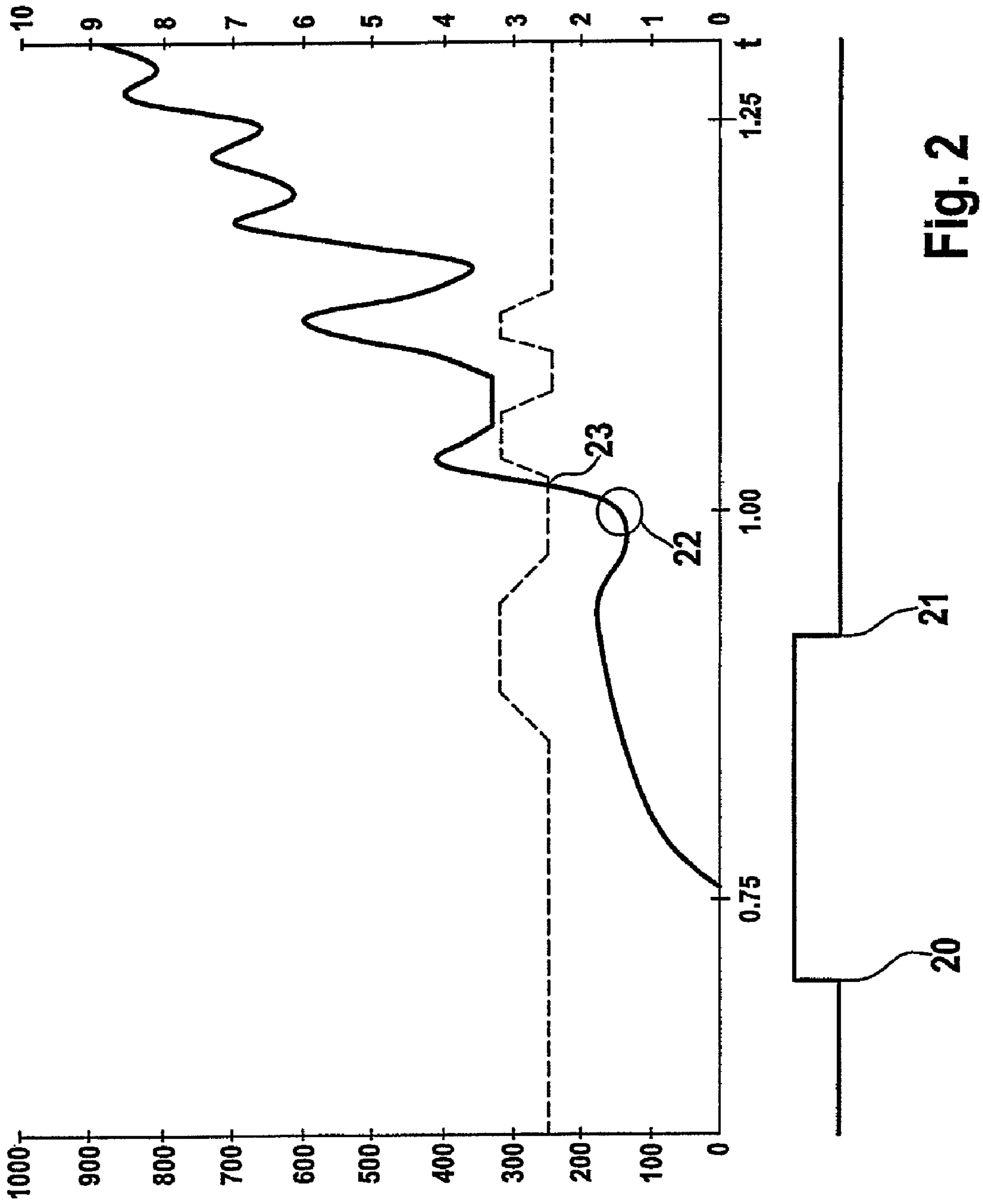
FIG. 2 is a diagram of different parameters of an internal combustion engine during the execution of a method according to FIG. 1.

Different parameters of a successful start of an internal combustion engine are depicted in FIG. 2. The diagrammatic description of FIG. 2 is based on the implementation of a method according to the invention corresponding to the diagrammatic description of FIG. 1. The curve shown in the lower partial diagram with a rectangular progression represents the operation of the electric machine, i.e. the starter. The starter is started at a certain point in time 20. Subsequently it is operated for a previously calculated angle differential of the crankshaft until the end-of-actuation angular position 21 is achieved. The internal combustion engine subsequently continues to run by itself due to the stored kinematical energy up until it has arrived at the first top dead center, whereat a combustion can be ignited, approximately at the point in time t=1. This point in time is designated by the number 22. Subsequently the rotational speed of the crankshaft precipitously increases due to the energy released during the combustion; and in so doing, a threshold for the combustion detection is exceeded shortly after the first combustion at a point 23. The threshold for the combustion detection, which is depicted by a dashed line, is used in conventional starting systems to trigger the disconnection of the starter. As can be seen from the diagram, it is possible with the method according to the invention to operate the starter for a significantly shorter time span and to limit the rotational speed of the starter. Said limit of the rotational speed is important because the starter already disengages when the rotational speed is significantly under 300 revolutions per minute. This helps to keep down the wear on the parts.

Figure 3:
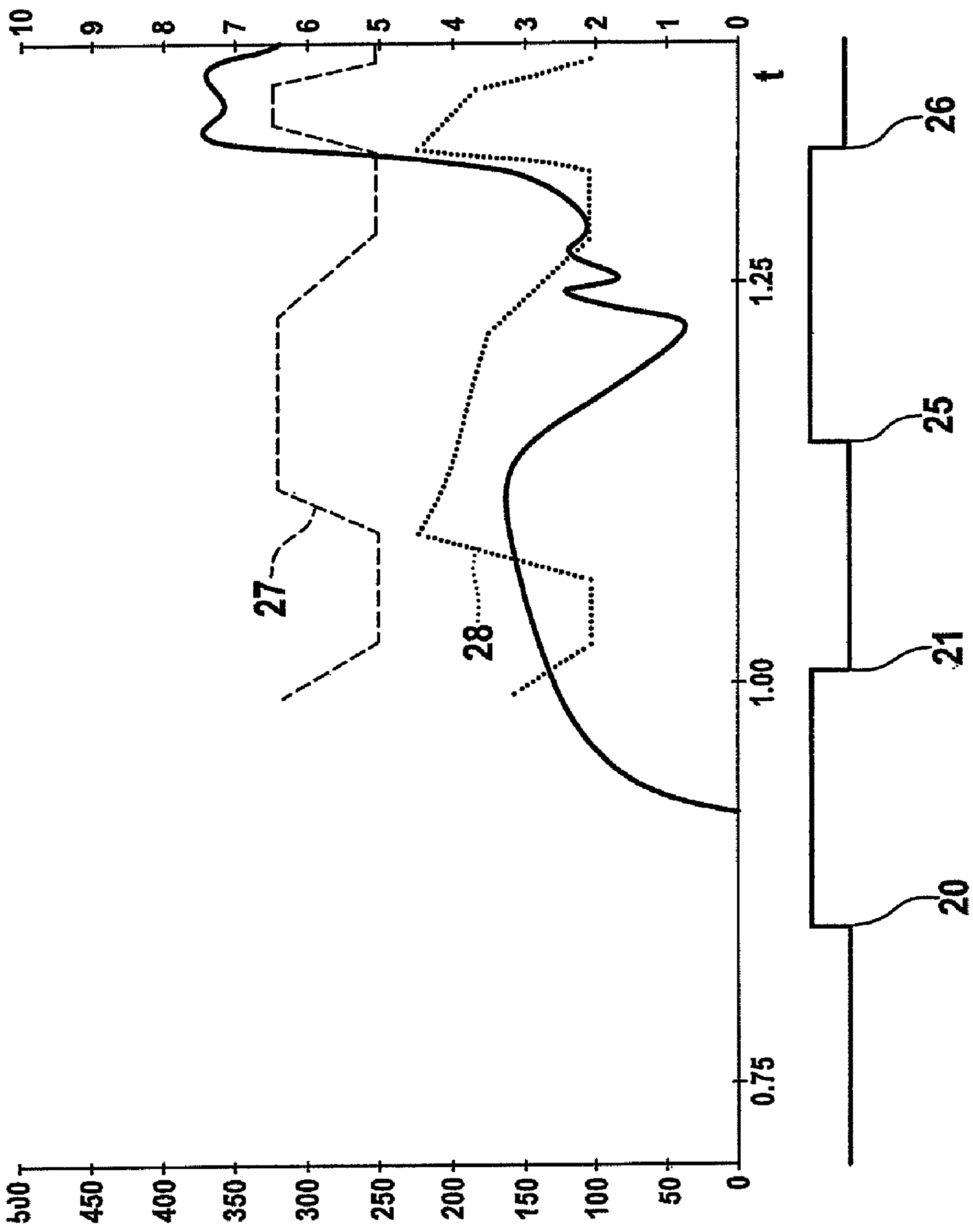
FIG. 3 is an additional diagram with parameters of the internal combustion engine during execution of a method according to the invention and in accordance with FIG. 1.

FIG. 3 shows an enhanced depiction of the special case, wherein the combustion does not begin as predicted at the first top dead center. In so doing, like reference numerals denote like events as in FIG. 2. Hence, the starter is in turn switched on at a point in time 20 and subsequently disengaged at a point in time 21. A precipitous drop in the rotational speed of the crankshaft (point in time 25) occurs however after a maximum rotational speed has been exceeded at top dead center. At the same time, the method detects that the prevailing rotational speed at the point in time 25 is to low to achieve the next top dead center. The threshold for the rotational speed in order to achieve the next top dead center is depicted by the dotted line 28, which fluctuates between 100 and 220 revolutions per minute. The height of this threshold is a function of the angular position of the crankshaft because as the case may be, compression work must be performed to achieve dead center. The method detects at the point in time 25 that the start-up was not successful, so that the starter has to be engaged again. A premature disengagement of the starter is subsequently dispensed with, and the starter remains engaged until the rotational speed of the crankshaft has achieved the conventional threshold for combustion detection (point in time 26). The threshold for the detection of a combustion, as it is conventionally used, is plotted in the diagram with a dashed line between approximately 250 and 350 revolutions per minute and is denoted by the reference numeral 27.

The invention claimed is:

1. A method of controlling a start-up of an internal combustion engine, comprising:

starting an actuation of the internal combustion engine and maintaining the actuation by an electric machine to set the internal combustion engine into an independent motion;

driving a crankshaft of the internal combustion engine with the electric machine during the actuation;

ascertaining a combustion-angular position of the crankshaft prior to, during, or immediately following a start of the actuation; and terminating the actuation before an initial combustion in the internal combustion engine occurs, wherein terminating the actuation is accomplished prior to the crankshaft achieving the ascertained combustion-angular position, wherein a first combustion in the internal combustion engine is expected at said combustion-angular position.

2. A method according to claim 1, further comprising terminating the actuation at an end-of-actuation angular position of the crankshaft, wherein the end-of-actuation angular position is ascertained prior to, during or immediately following the start of the actuation.

3. A method according to claim 2, further comprising ascertaining the end-of-actuation angular position and/or the combustion-angular position as: a) a function of a temperature of the internal combustion engine, b) an at rest angular position of the internal combustion engine prior to the start of actuation; and/or c) another parameter.

4. A method according claim 1, further comprising comparing a rotational speed of the crankshaft with a dead center minimum rotational speed, wherein at the dead center minimum rotational speed the internal combustion engine achieves a next top dead center without actuation, and wherein the actuation of the internal combustion engine is only terminated in an event that the rotational speed of the crankshaft is at least as high as the dead center minimum rotational speed.

5. A method according to claim 4, further comprising restarting the actuation after an actuation termination in an event that the rotational speed of the crankshaft after the termination is lower than a dead center minimum rotational speed and/or in the event that the rotational speed drops.

6. A method according to claim 5, further comprising terminating the restarting of actuation after the rotational speed of the crankshaft has achieved: a) a combustion-minimum rotational speed; and/or b) a speed greater than the dead center minimum rotational speed.

7. An apparatus, particularly a control unit, for the implementation of a method of controlling a start-up of an internal combustion engine, wherein an actuation of the internal combustion engine is started and maintained by an electric machine to set the internal combustion engine into an independent motion, the method comprising:

driving a crankshaft of the internal combustion engine with the electric machine during the actuation;

ascertaining a combustion-angular position of the crankshaft prior to, during, or immediately following a start of the actuation; and terminating the actuation before an initial combustion in the internal combustion engine occurs, wherein terminating the actuation is accomplished prior to the crankshaft achieving the ascertained combustion-angular position, wherein a first combustion in the internal combustion engine is expected at said combustion-angular position.

8. A computer program product with a program code stored on a machine readable device and executed on a controller for controlling a start-up of an internal combustion engine, the program code including instructions for:

starting an actuation of the internal combustion engine and maintaining the actuation by an electric machine to set the internal combustion engine into an independent motion;

driving a crankshaft of the internal combustion engine with the electric machine during the actuation;

ascertaining a combustion-angular position of the crankshaft prior to, during, or immediately following a start of the actuation; and terminating the actuation before an initial combustion in the internal combustion engine occurs, wherein terminating the actuation is accomplished prior to the crankshaft achieving the ascertained combustion-angular position, wherein a first combustion in the internal combustion engine is expected at said combustion-angular position.

* * * * *